March 7, 1967  F. D. MARTZLOFF ET AL  3,308,346
GROUND CABLE CONTINUITY CHECK CIRCUIT
Filed May 10, 1965  2 Sheets-Sheet 1
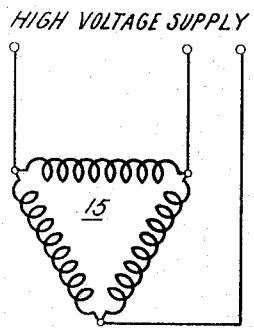
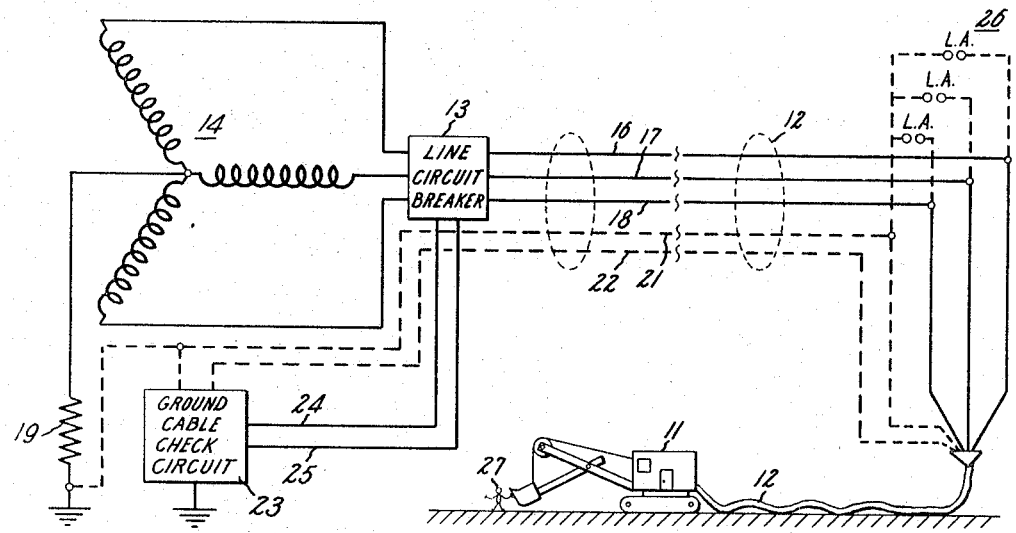
Inventors:
Francois D. Martzloff,
Burnice D. Bedford,
by Charles W. Helzer
Their Attorney.

March 7, 1967  F. D. MARTZLOFF ET AL  3,308,346
GROUND CABLE CONTINUITY CHECK CIRCUIT Filed May 10, 1965  2 Sheets-Sheet 2

Inventors:
Francois D. Martzloff,
Burnice D. Bedford,
by Charles W. Helzer
Their Attorney.

United States Patent Office 3,308,346
Patented Mar. 7, 1967

3,308,346
GROUND CABLE CONTINUITY CHECK
CIRCUIT
Francois D. Martzloff, Schenectady, and Burnice D. Bedford, Scotia, N.Y., assignors to General Electric Company, a corporation of New York
Filed May 10, 1965, Ser. No. 454,479
17 Claims. (Cl. 317—18)

This invention relates to a new and improved ground cable continuity check circuit.

More particularly, the invention relates to a highly sensitive circuit for detecting and signaling the existence of a fault, poor connection, etc., which produces any increase in resistance over a predetermined safe value of a ground cable used to effectively ground portable electric equipment.

In the operation of portable electric equipment such as electrically driven earth shovels, drills, etc., it is not practical to provide a reliable driven ground at each location where the equipment operates for temporary periods. For this reason, it has been the practice to provide the necessary grounding (required for personnel safety) through a grounding conductor ordinarily incorporated in and comprising a part of the power supply cable which trails along between the equipment and its source of electric power. Because of the environment in which this equipment is used, carelessness, etc., it is quite possible for this grounding conductor to become damaged, improperly connected, etc., so that its resistance increases above some predetermined safe level. With any amount of appreciable resistance in this grounding conductor, it is possible to induce rather large voltages at the portable equipment (measured to ground) which are potentially injurious to personnel working around the equipment. In the past, ground conductor continuity check circuits have been available; however, these circuits are not entirely satisfactory in that they are capable of detecting only substantial increases in resistance of the grounding conductors such as caused by breakages, etc., and are not sensitive to the more subtle (yet equally dangerous) gradual increases in resistance over a predetermined safe value such as may be caused by gradual wear and tear in service, deterioration due to environmental factors, weather, etc.

It is therefore a primary object of the present invention to provide a new and improved ground cable continuity check circuit having improved sensitivity to any increases in resistance of a grounding conductor above a predetermined safe level.

In practicing the invention a new and improved ground cable continuity check circuit is provided for a power supply cable having a ground conductor and an additional pilot conductor. The additional pilot conductor is for use in establishing the continuity of the ground conductor, and the ends of the ground conductor and the additional pilot conductor remote from the power supply are electrically interconnected so as to form a closed conductive loop. The new and improved ground cable continuity check circuit is designed for use with this arrangement, and comprises means for impressing a circulating direct current through this loop together with bridge circuit means for comparing the value of the circulating direct current in the loop to a reference value, and for deriving an output error signal indicative of any decrease in the value of the circulating direct current through the ground conductor loop. Since any decrease in the circulating direct current would be indicative of an increase in the resistance of the grounding conductor, this error signal can be employed to actuate an alarm, a circuit breaker or other means for indicating the rise in resistance of the grounding conductor above a predetermined safe level.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a functional block diagram of a power supply system including a ground cable continuity check circuit for use with electrically-operated portable equipment such as the excavation shovel shown;

Figure 2:
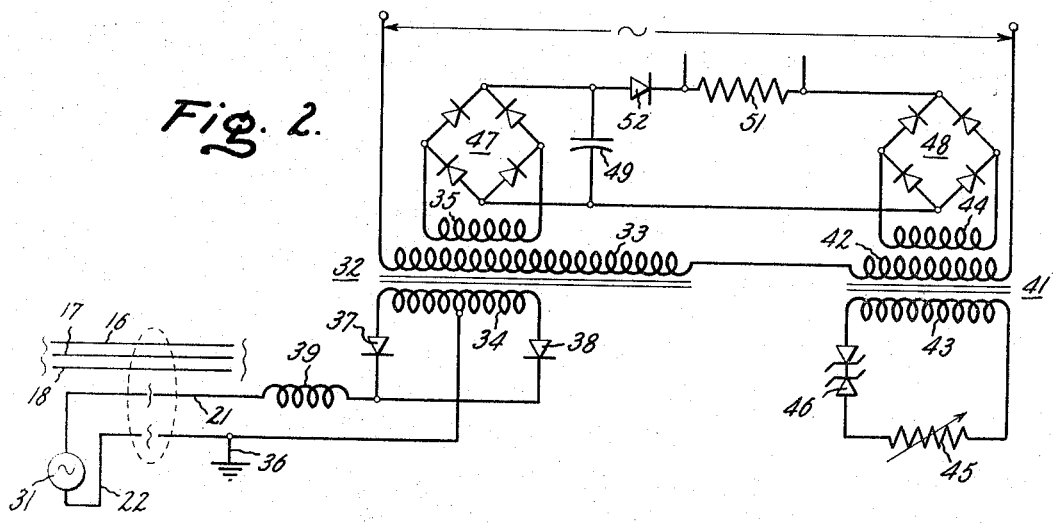
FIGURE 2 is a schematic circuit diagram of one form of a new and improved ground cable continuity check circuit constructed in accordance with the invention.

FIGURE 1 is a functional block diagram of a complete power supply including a ground cable continuity check circuit for supplying a portable excavation shovel shown at 11. Equipment of this nature is used in the mining industry in open pit mines for excavating and loading ore found in the open pit. Much of this equipment is electrically driven, and in order to provide electrical power to the equipment, a power supply cable such as shown at 12 is attached to the equipment and is connected back through an appropriate length of cable and a line circuit breaker 13 to a power supply source 14. For convenience a three phase power supply has been illustrated wherein the three phase windings of the Y connected secondary winding 14 of a power supply transformer are connected through individual conductors 16, 17 and 18 of power supply cable 12 to the equipment 11. The secondary winding 14 is inductively coupled to a delta connected primary winding 15 that in turn is supplied from a high voltage supply such as a power supply line.

As is conventional in the industry, the neutral point of the Y connected secondary windings 14 is grounded through a grounding resistor 19. The three conductors 16, 17 and 18 are generally enclosed within a sheath comprising a part of the power cable 12 which also includes a ground conductor 21 shown in dotted lines. This ground conductor 21 extends all the way to the portable equipment 11 to which power is being supplied, and is connected back to an earth ground at the source, together with the grounding resistor 19. Preferably, the power supply cable will also include an additional pilot conductor 22 shown in dotted lines similar to the ground conductor 21 which extends all the way to the portable equipment 11, and is enclosed within the outer sheath 12 surrounding all five conductors.

The grounding conductor 21 and the pilot conductor 22 are electrically insulated from each other throughout their length and do not pass through the line circuit breaker 13. However, the ends of the ground conductor 21 and pilot conductor 22 remote from the power supply 14 are electrically interconnected at the equipment end of the cable perhaps through the equipment itself. The power supply ends of the ground conductor 21 and the pilot conductor 22 are then supplied to the input of a ground cable continuity check circuit 23 having its output connected through the conductors 24 and 25 to the input of the line circuit breaker 13 for actuating the line circuit breaker 13. For completeness sake, lighting arresters illustrated at 26 are employed to interconnect each of the power supply conductors 16, 17 and 18 to the ground conductor 21 for protection against lightning strokes as is standard in the art.

In operation, electric power for the electrically driven power shovel 11 is supplied through the power supply conductors 16, 17, 18 to the shovel 11. In case of insulation failure in the cable or equipment in the shovel, the resulting fault current, although limited by the ground resistor 19, will reach significant values in the ground cable 21. If there is any substantial amount of resistance in the ground conductor 21, a voltage will be developed at the equipment end 11 of the cable measured to ground as a result of the voltage drop across this resistance due to the fault current. This voltage will, of course, be determined by the value of the resistance of the ground conductor. As a consequence, if personnel such as are indicated at 27 working along the equipment 11 happen to touch the equipment, they will be subjected to an electrical shock. Since in fact that it is impossible for the ground conductor 21 not to have some value of resistance, particularly if the trailing cable 12 is very long, it is necessary that steps be taken to assure that this resistance is maintained below a minimum predetermined safe value ordinarily considered to be in the neighborhood of 1 ohm. However, if in the course of operation, a truck or other excavation equipment drives over the power cable so as to damage it and cause its resistance to increase, or if in hooking up additional links of the trailing cable 12 a poor connection is made, it is possible for this total resistance to rise above this predetermined safe level. In this event, the voltages developed at the equipment end of the ground conductor can be so substantial as to represent a hazard to personnel working around the equipment.

For the above reason, the ground cable check circuit is provided for continuously checking the effective resistance of the ground conductor 21, and for interrupting power supply to the equipment 11 (through the medium of the line circuit breaker 13) upon this effective resistance going over a predetermined safe level. One form of ground cable continuity check circuit suitable for this purpose is illustrated in FIGURE 2 of the drawings. In FIGURE 2 of the drawings, a portion of the power supply conductors are shown at 16, 17 and 18 together with a length of their associated ground conductor 21 and pilot conductor 22. As stated above, it is assumed that the ground conductor 21 and the pilot conductor 22 are electrically interconnected at the equipment end so as to form a closed conductive loop. Also, because this closed conductive loop is in close inductive relationship with the power supply conductors 16–18, an alternating current voltage will be induced in the loop. This induced alternating current voltage is indicated at 31 as a lumped A.C. voltage generator for the sake of convenience.

The ground cable continuity check circuit is operatively connected to the closed conductive loop comprised by the ground conductor 21 and the pilot conductor 22. This circuit basically comprises a means for impressing a circulating direct current through the loop formed by the ground conductor 21 and the pilot conductor 22 together with bridge circuit means for comparing continuously the value of the circulating direct current in this loop to a reference value, and for deriving an output error signal indicative of any decrease in the value of the circulating direct current through the ground conductor loop.

The means for impressing a circulating direct current through the ground conductor loop is comprised by a first supply transformer 32 having its primary winding 33 coupled in series with the primary of a ballast transformer 41 across a constant voltage source of alternating current, and having a secondary winding 34 and a tertiary winding 35. The mid-point of the secondary winding 34 is connected directly to the pilot conductor 22 and to ground as shown at 36, and the two ends of secondary winding 34 are connected to diode rectifiers 37 and 38 to the ground conductor 21. In order to limit circulation of any alternating current voltage through the closed conductive loop comprised by conductors 21 and 22, a choke coil 39 is connected between the ground conductor 21 and the rectifiers 37 and 38. By this arrangement, the alternating current potential supplied to transformer 32 is rectified by the rectifiers 37 and 38, and the resulting direct current impressed upon the closed conductive loop comprised by ground conductor 21 and pilot conductor 22. The value of the choke coil 39 is adjusted so as to assure that the circulating direct current through this closed conductive loop always exceeds any induced alternating current flow.

The bridge circuit means for comparing the value of the circulating direct current in the ground conductor loop to a reference value is comprised in part by a ballast supply transformer 41. The ballast transformer 41 has its primary winding 42 connected in series circuit relationship with the primary winding 33 across the constant voltage alternating current source, and has a secondary winding 43 and a tertiary winding 44. The secondary winding 43 is coupled across a variable resistor 45 and series connected Zener diode 46. In operation, the variable resistor 45 is adjusted so that the voltage drop developed across the secondary winding 43 is equal to the voltage drop developed across the secondary winding 34 of the first supply transformer, and the Zener diodes 46 are designed to compensate for nonlinearities introduced by the rectifying diodes 37 and 38 in the ground conductor loop connected across the secondary winding 34. By reason of these design characteristics, the voltages developed across the tertiary windings 35 and 44 of the first supply transformer 32 and the ballast transformer 41, respectively, are equal. Any increase in the resistance of the ground conductor loop 21 will cause a corresponding increase in the voltage across the second secondary winding 35 which then offsets this ballast condition.

In order to detect the unbalancing of the voltages appearing across each of the tertiary windings 35 and 44 respectively, a rectifier bridge 47 is connected across the winding 35 and a rectifier bridge 48 is connected across the winding 44. The outputs of each of the rectifier bridges 47 and 48 are operatively interconnected across a comparison circuit means for deriving an output error signal indicative of any unbalance in the voltages appearing across the windings 35 and 44, respectively.

The comparison circuit means comprises a filter capacitor 49 and a load resistor 51 and a diode rectifier 52. By reason of the inclusion of the diode rectifier 52, an error signal will be developed across the load resistor 51 only when the voltage across the winding 35 exceeds the voltage across the winding 44 so that only increases in the resistance of the ground conductor 21 are detected. As a consequence, the circuit is insensitive to insignificant decreases in the resistance of the ground conductor loop. The error signal developed across the load resistor 51 may then be used to drive the line circuit breaker 13 shown in FIGURE 1 of the drawings through any suitable amplification circuit such as a relay, a transistor or silicon controlled rectifier.

In operation, the center tap output of winding 34 is rectified by rectifiers 37 and 38 to obtain a circulating direct current through the ground loop comprised by ground conductor 21, pilot conductor 22, and choke coil 39. The value of the choke coil 39 is such that any instantaneous alternating current that might be induced in the loop by the proximity of the power conductors 16–18, is maintained lower than the circulating direct current supplied from winding 34 and rectifiers 37 and 38. The value of the variable resistance 45 is adjusted so that the voltage across the winding 44 is equal to the voltage across the winding 35. If these voltages balance, no output error signal will be developed across the resistor 51. Any increase in the resistance of the ground conductor 21, will then cause a corresponding increase in the voltage appearing across the winding 35. This increase in voltage across winding 35 will then produce an unbalanced condition causing an error current to flow through the resistor 51. By appropriate design, upon this error current reaching a predetermined magnitude, it will trip the line circuit breaker, or other alarm mechanism to indicate the rise in resistance of the ground conductor.

As a consequence of the above arrangement, it can be appreciated that the new and improved ground cable continuity check circuit provides complete isolation of the ground conductor loop, the power supply and the output circuits. Its actuation is determined primarily by the ratio of the two voltages appearing across the windings 35 and 44 rather than more complex relations, and hence it is very dependable in operation. The auxiliary load or ballast circuit can be designed to be at a lower power level thereby minimizing cost and power loss. Effective elimination of induced alternating current noise reduces the chance of erroneous tripping thereby overcoming a considerable difficulty which has caused prior art approaches to operate at low sensitivity. Additionally, the output is not appreciably affected by changes in temperature of the control circuit. Accordingly, it can be appreciated therefore that the invention provides a new and improved ground cable continuity check circuit having improved sensitivity to any increases in resistance of a ground conductor above a predetermined safe level.

Figure 3:
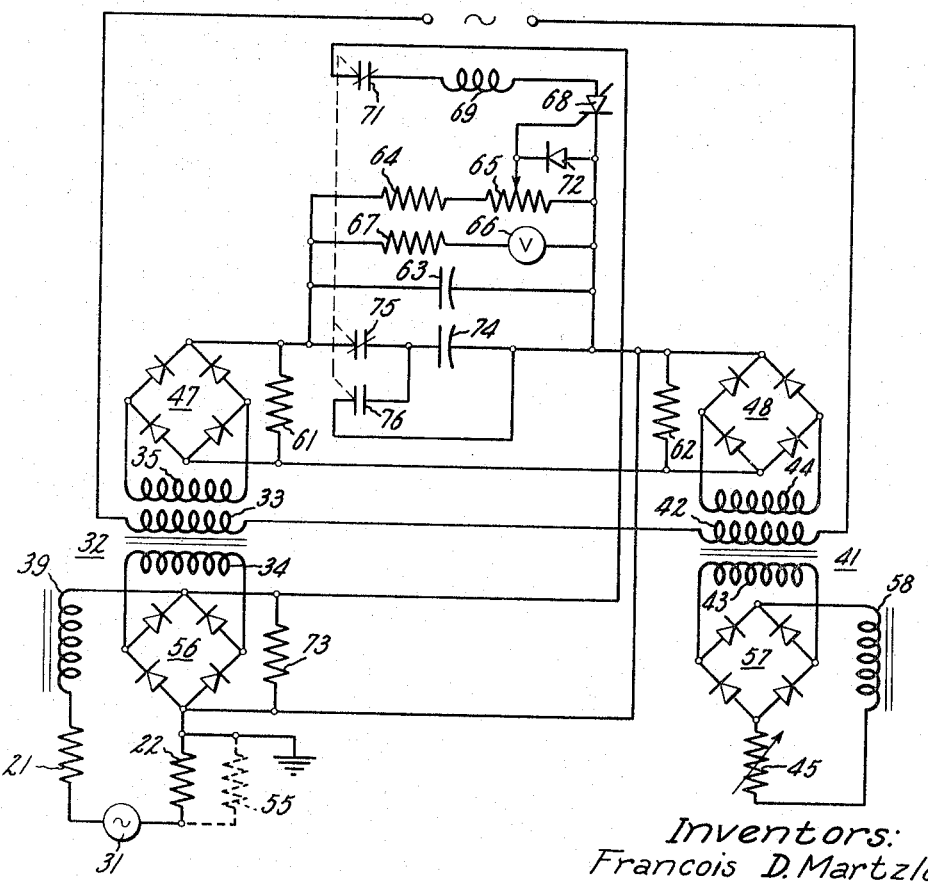
FIGURE 3 is a detailed schematic circuit diagram of a second and preferred form of the new and improved ground cable continuity check circuit constructed in accordance with the invention.

A preferred form of a new and improved ground cable continuity check circuit is illustrated in FIGURE 3 of the drawings. This preferred form of the circuit includes certain refinements not present in the FIGURE 2 circuit which facilitates use of the circuit in the field and allows it to discriminate effectively against undesired induced alternating current signals as well as transient D.C. signals developed during inrush periods of operation of the power supply conductors. The ground conductor to be monitored is represented by a small finite resistance 21, the pilot conductor is represented by a small finite resistance 22, and the source 31 represents the induced E.M.F. capability of these conductors due to their proximity to the power supply conductors 16, 17, 18 as shown in FIGURES 1 and 2 of the drawings. Further, if the portable equipment 11 being grounded rests on the ground with something less than an infinite resistance to the earth ground, an additional resistance 55 of variable magnitude (shown in dotted outline form) exists in parallel with the resistance 22 of the pilot conductor. It is of course understood that the ends of the ground conductor 21 and pilot conductor 22 (represented by the resistor 21 and 22) which are remote from the ground continuity check circuit are electrically interconnected so as to form a conductive ground loop.

A circulating direct current is impressed on this conductive loop by a first rectifier bridge 56 having its output terminals connected across the ground conductor loop through a choke coil 39, and having its input coupled across the output terminals of a secondary winding 34 of a first power supply transformer 32. The power supply transformer 32 has its primary winding 33 connected in series with the primary of a transformer 41 across a constant voltage source of alternating current, and in addition has a tertiary winding 35. By this arrangement, the alternating current supplied to secondary winding 34 is rectified by bridge 56 and the rectified direct current circulated through the ground conductor loop including the choke coil 39. The choke coil 39 by its design offers a high impedance to the induced alternating current ground conductor voltage represented by the source 31, while its resistance to direct current is negligible.

The primary winding 33 of the supply transformer 32 is connected in series circuit relationship with a primary winding 42 of a ballast transformer 41 having a secondary winding 43 and a tertiary winding 44. The secondary winding 43 of ballast transformer 41 is coupled across the input terminals of a second rectifier bridge 57 having its output terminals coupled across a closed ballast conductive loop comprised by a variable resistor 45 and series connected choke coil 58. By this arrangement, the variable resistor 45 can be adjusted to have values of resistance corresponding to the various possible net values of the resistances 21, 22, and 55 of the ground conductor loop. In addition, the choke coil 58 is designed so that it is identical to the choke coil 39, and similarly the rectifier bridge 57 is identical to the rectifier bridge 56. As a consequence the circuit comprised by variable resistor 45, rectifier 57, and choke 58 constitutes an analog counterpart of the ground conductor loop. In addition, the ballast supply transformer 41 is identical in design to the first supply transformer 32 so that when the variable resistor 45 is properly adjusted, the voltages appearing across the tertiary winding 35 and 44 will be equal.

The voltages appearing across the tertiary windings 35 and 44 are rectified by a third rectifier bridge 47 and a fourth rectifier bridge 48, respectively, and applied to a comparison circuit means operatively connected in common to the outputs of both the third and fourth rectifier bridges. This comparison circuit means comprises a pair of relatively high resistors 61 and 62 connected across the outputs of rectifier bridges 47 and 48 respectively, and a filter capacitor 63 interconnecting these two resistors so as to provide a loading filter effect for the output of the two rectifier bridges. Any difference between the averages of the voltages appearing across the windings 35 and 44, will appear across an output resistor divider comprised by a pair of resistors 64 and 65 connected in series circuit relationship across filter capacitor 63. This difference voltage is also applied across a voltmeter 66 and series connected large resistor 67. The meter 66 is used to manually adjust the value of the variable resistor 45 for a specific length of power cable under the prevailing cable operating in environmental conditions when initially placing the circuit in operation. Accordingly, the value of the variable resistor 45 is set so that the two voltages across the windings 35 and 44 are equal, and there is no voltage across the resistor bridge 64, 65, and meter 66.

If the resistance of the ground conductor loop increases during operation of the portable equipment as a result of mechanical damage to the ground conductor, poor connecion in a plug, etc., the balance of the two voltages appearing across the windings 35 and 44 is upset by an increase in the voltage across the winding 35. As this voltage increases above the voltage across the winding 44, a positive voltage will appear across the resistor divider 64, 65. This positive voltage is supplied to the control gate of a gate controlled semiconductor switch 68 such as a silicon controlled switch, a Triac, or a silicon controlled rectifier. Upon the increasing potential across the resistor 65 reaching a predetermined threshold value, it will cause the gate controlled semiconductor switch 68 to turn on. This results in energizing the field winding 69 of a relay used to actuate the line circuit breaker 13 of the system shown in FIGURE 1, or some similar alarm circuitry. Because the switch 68 will remain conductive once it is turned on, the circuit provides a latching action even if the gate signal thereafter is removed. In order to reset the circuit, the power supply can be momentarily removed as by manually opening a set of contacts 71 connected in the anode circuit of the switch 68. This would normally be done after the hazardous conditions signaled by actuation of the circuit has been investigated and/or corrected.

In order to protect the gate controlled switch 68, a clamping diode 72 is connected across the control gate of the switch 68 so as to limit any reverse voltage that might be developed across the output circuit from damaging the switch 68. This might occur if the additional resistance 55 has an extremely low value, or if the value of the variable resistor 45 were grossly maladjusted during the balancing operation. In addition the current drawn through this clamping diode and the resistor 64 would also provide enough loading for the output circuit to hold any reverse voltage across the capacitor 63 to a safe value. Operating potential for the relay coil energized by the gate controlled semiconductor switch 68 is provided from the first rectifier bridge 56.

In addition to the clamping diode 72, a limiting resistor 73 is connected across the output terminals of the first rectifier bridge 56 in parallel with the ground conductor loop. The value of the limiting resistor 73 is designed so that it will cause no loss in sensitivity with any practical value of ground conductor resistance, while in the event of an opening of the ground conductor loop, it will prevent the voltages developed across the winding 35 from reaching excessive values, and possibly damaging the ground continuity check circuit.

Besides the above features, the circuit of FIGURE 3 includes an additional large capacitor 74 connected in series circuit relationship with a normally closed contactor 75 in parallel with the filter capacitor 63. A normally opened contactor 76 is connected across with the additional capacitor 74 for purposes to be described more fully hereinafter. The large capacitor 74 serves to increase the time constant of the comparison circuit means to avoid erroneous operation of the ground conductor continuity circuit. With the additional capacitor 74 connected in the circuit through normally closed contact 75, spurious direct current signals which might be induced in the ground conductor loop during the momentary inrush of current through the power conductors 16–18 upon initiation and turn-off of the supply of current through these conductors, can be avoided. This is achieved by increasing the time constant of the output circuit beyond the duration of such possible spurious direct current signals. Additionally, when the ground conductor loop and the ballast loop are initially energized with circulating direct current, the time constant of these two circuits may not be sufficiently equal. As a consequence, a short period may exist where the current circulating in the ground conductor loop may be smaller than the current circulating in the ballast loop. As a consequence, the total circuit would react as if the ground conductor resistance were excessive and cause an erroneous trip before any ballast condition could be reached. By inserting the additional capacitor 74 in the comparison circuit, it does not respond to such erroneous trip signals, and hence is more reliable in operation.

The inclusion of the additional capacitor 74 in the circuit, however, becomes objectionable when it is desired to initially balance the circuit for operation. Unless the operator is highly trained, he would have considerable difficulty in manipulating the variable resistor 45 with a time lag in the response of the meter 66. Therefore, the manual reset button which actuates contactors 71 and 75 also includes the normally opened switch 76 which can be used to temporarily short-circuit the additional capacitor 74 from the circuit and remove this time lag during initial alignment proceedings.

In operation, the circuit in FIGURE 3 operates in an entirely similar fashion to the circuit arrangement of FIGURE 2 to develop an output alarm signal. It therefore possesses all of the advantages of the FIGURE 2 circuit and also provides certain additional advantages. One of these is that the full scale ballast conductive loop provides great flexibility for the circuit to be used in a wide range of applications without additional special design effort and expense. In addition, the circuit is applicable to almost any cable configuration for any specified level of induced alternating current noise. About the only criterion to be vigorously adhered to is that the instantaneous induced alternating current circulating through the ground conductor loop must not exceed the circulating direct current supplied by the circuit. This simple criterion makes it possible to optimize the size of the chokes used in the circuit for any specific cable condition without requiring redesign of the circuit. The two supply transformers 32 and 41 are conventional industrial transformers which preferably are operated with their primary windings at half their rated voltages so that the effect of imperfect matching of these relatively inexpensive supply transformers is minimized. In fact, the circuit has been designed with all standard industrial components with the exception of the custom-made chokes (which can be readily specified and procured) thereby making it possible to construct the circuit at minimum cost.

An improved design of the circuit shown in FIGURE 3 could be obtained by changing the turns ratio of the ballast transformer 41 so that only a fraction of the power dissipated in the ground conductor loop is dissipated in the ballast side of the circuit. However, such an analog ballast circuit would be more difficult to design as the nonlinearities of the circuit such as the transformer reactance, the rectifier drop, etc., must also be scaled down. Whether such a specially designed ballast transformer would be employed would depend primarily on economics of the situation where the advantage of employing standard commercial and industrial components must be weighed against the savings that would be made possible by a low power analog ballast circuit. This choice would be determined by trade off between lower parts costs for more expensive design, and will depend upon the production quantities. Additionally, it should be noted that while only a single protective system has been disclosed for protecting a single portable equipment, it is possible to array any number of such protective systems for a required number of portable equipments, and supply the same from a single power source through the use of an appropriate number of properly grounded substations.

From the foregoing description, it can be appreciated that the invention provides a new and improved ground cable continuity check circuit having improved sensitivity to any increases in the resistance of a grounding conductor above a predetermined safe level. In addition to this very substantial advantage, the circuit can be made from standard rugged industrial components which are capable of withstanding the considerable wear and tear of the service environment in which the circuit will be used. All of these advantages make the circuit particularly desirable for use in connection with portable equipment for personnel protection purposes.

Having described several embodiments of a new and improved ground continuity check circuit constructed in accordance with the invention, it is believed obvious that other modifications and variations of this invention are possible in light of the above teachings. It is therefore to be understood that changes may be made in the particular embodiments of the invention described which are within the full and intended scope of the invention as defined by the appended claims.

What we claim as new and desire to secure by Letters Patent of the United States is:

1. In a ground cable continuity check circuit for a power supply cable having a grounding conductor and an additional pilot conductor for use in establishing the continuity of the grounding conductor and having the ends of the grounding conductor and the additional pilot conductor remote from the power supply electrically interconnected so as to form a closed conductive loop, the improvement comprising means for impressing a circulating direct current through the loop thus formed, and bridge circuit comparison means for comparing the value of the circulating direct current in the loop to a reference value and for deriving an output error signal indicative of any decrease in the value of the circulating direct current through the ground conductor loop.

2. The combination set forth in claim 1 further characterized by means for limiting induced alternating current flow in the closed conductive loop formed by the grounding conductor and the additional pilot conductor.

3. The combination set forth in claim 1 further characterized by means for increasing the time constant of the circuit so as to render it relatively insensitive to undesired direct current voltage transients induced in the grounding conductor.

4. In a ground cable continuity check circuit for a power supply cable having a grounding conductor and an additional pilot conductor for use in establishing the continuity of the grounding conductor and having the ends of the grounding conductor and the additional pilot conductor remote from the power supply electrically interconnected so as to form a closed conductive loop, the improvement comprising means for impressing a circulating direct current through the loop thus formed, a ballast conductive loop having a reference current flowing therein, and bridge circuit means for comparing the value of the circulating direct current in the loop formed by the ground conductor to the reference current flowing in the ballast conductive loop and for deriving an output error signal indicative of any decrease in the value of the circulating direct current through the ground conductor loop.

5. The combination set forth in claim 4 further characterized by means for varying the value of the reference current flowing in the ballast conductive loop to adjust for variations in the length of the grounding conductor.

6. The combination set forth in claim 4 further characterized by means for limiting induced alternating current flow in the closed conductive loop formed by the grounding conductor and the additional pilot conductor.

7. The combination set forth in claim 4 further characterized by means for varying the value of the reference current flowing in the ballast conductive loop to adjust for variations in the length of the grounding conductor, means for limiting induced alternating current flow in the closed conductive loop formed by the grounding conductor and the additional pilot conductor, and means for increasing the time constant of the ground cable continuity check circuit so as to render it relatively insensitive to undesired direct current voltage transients induced in the grounding conductor.

8. In a ground cable continuity check circuit for a power supply cable having a grounding conductor and an additional pilot conductor for use in establishing the continuity of the grounding conductor and having the ends of the grounding conductoor and the additional pilot conductor remote from the power supply electrically interconnected so as to form a closed conductive loop, the combination comprising circuit breaker means connected in circuit relationship with the power supply cable for interrupting current flow therethrough, means for impressing a circulating direct current through the grounding conductor loop, bridge circuit means for comparing the value of the circulating direct curent in the ground conductor loop to a reference value and for deriving an output error signal indicative of any decrease in the ground conductor loop, and means for coupling the error signal thus derived back to the circuit breaker means for interrupting power flow through the power supply cable in response to a decrease in the value of the direct current circulating through the ground conductor loop.

9. In a ground cable continuity check circuit for a power supply cable having a grounding conductor and an additional pilot conductor for use in establishing the continuity of the grounding conductor, and having the ends of the grounding conductor and the additional pilot conductor remote from the power supply electrically interconnected so as to form a closed conductive loop, a first supply transformer having its primary winding operatively coupled to a source of alternating current and having secondary and tertiary windings, a first rectifier bridge operatively coupled to the secondary winding of the first supply transformer and to the closed conducting loop comprised by the grounding conductor and the pilot conductor for supplying a circulating direct current therethrough, a ballast supply transformer having its primary winding operatively coupled in series circuit relationship with the primary winding of the first supply transformer across the source of alternating current voltage and having secondary and tertiary windings, a second rectifier bridge operatively connected to the secondary winding of the ballast supply transformer, a ballast conductive loop having means for varying the current flowing therethrough operatively connected to the second bridge rectifier, third and fourth bridge rectifiers operatively connected to the tertiary windings of the first and ballast supply transformers, respectively, and comparison circuit means operatively connected in common to the outputs of both said third and fourth bridge rectifiers for deriving an output error signal indicative of any decrease in the value of the circulating direct current through the ground conductor loop.

10. The combination set forth in claim 9 wherein the comparison circuit means includes a resistor divider interconnected between the outputs of the third and fourth bridge rectifiers, a high resistance voltmeter connected across the resistor divider, and a gate controlled power semiconductor device having its control gate operatively coupled to the resistor divider and having the field winding of a relay connected to its load terminals.

11. The combination set forth in claim 10 further characterized by a capacitor connected in parallel with the resistor divider for increasing the time constant of the ground cable continuity check circuit.

12. The combination set forth in claim 10 further characterized by a capacitor connected in parallel with the resistor divider for increasing the time constant of the ground cable continuity check circuit, and switching means for disconnecting and shorting out the last-mentioned capacitor during initial alignment of the ballast conductive loop.

13. The combination set forth in claim 9 further characterized by a limiting circuit connected across the output of the first bridge rectifier in parallel circuit relationship with the ground conductor loop.

14. The combination set forth in claim 9 further characterized by choke coils connected in the ground conductor loop and in the ballast conductive loop, respectively, for limiting induced alternating current flow through the ground conductor loop and for matching the impedance and time constant of the ballast conductive loop to the ground conductor loop.

15. The combination set forth in claim 9 wherein the comparison circuit means includes a resistor divider interconnected between the outputs of the third and fourth bridge rectifiers, a high resistance voltmeter connected across the resistor divider, a gate controlled power semiconductor device having its control gate operatively coupled to the resistor divider and having the trip winding of a relay device connected to its load terminals, and a clamping diode connected across the control gate circuit of the power semiconductor device, and wherein the combination is further characterized by a capacitor connected in parallel with the resistor divider for increasing the time constant of the ground cable continuity check circuit, switching means for disconnecting and shorting out the last-mentioned capacitor during initial alignment of the ballast conductive loop, a limiting resistor connected across the output of the first bridge rectifier in parallel with the ground conductor loop, and choke coils connected in the ground conductor loop and the ballast conductive loop, respectively.

16. The combination set forth in claim 9 wherein the supply and ballast transformer are similar in construction and rating and are operated substantially below their rated voltage so as to minimize the effects of imperfect matching of these transformers.

17. The combination set forth in claim 9 wherein the ballast supply transformer has a different turns ratio from the first supply transformer so that only a fraction of the power dissipated in the ground cable conductive loop, is dissipated in the ballast conductive loop.

References Cited by the Examiner

UNITED STATES PATENTS

| | | | |
|---|---|---|---|
| 2,700,125 | 1/1955 | King | 317—18 X |
| 3,141,128 | 7/1964 | Behr | 317—18 X |
| 3,171,062 | 2/1965 | Rowe | 317—18 |
| 3,230,424 | 1/1966 | Gagniere | 317—18 |
| 3,234,316 | 2/1966 | Mathews | 317—18 |

References Cited by the Applicant

AIEE Conference Paper 59–1213, presented October 1959, entitled "A Review of Open-Pit Mine-Power Distribution Practices." Copies available from the authors, R. S. Bennett, associate member AIEE, G.E. Co., Cincinnati, Ohio; M. A. Neslin, member AIEE, G.E. Co., Schenectady, N.Y.

MILTON O. HIRSHFIELD, *Primary Examiner.*

R. V. LUPO, *Assistant Examiner.*